(12) United States Patent
Von Zell

(10) Patent No.: US 7,559,817 B2
(45) Date of Patent: Jul. 14, 2009

(54) CANINE SWIM SAFE VEST AND COLLAR

(76) Inventor: Ernest A. Von Zell, 623 Plain Rd., Warrenton, VA (US) 20186

( * ) Notice: Subject to any disclaimer, the term of this patent is extended or adjusted under 35 U.S.C. 154(b) by 0 days.

(21) Appl. No.: 12/075,116

(22) Filed: Mar. 7, 2008

(65) Prior Publication Data

US 2008/0227346 A1    Sep. 18, 2008

Related U.S. Application Data

(60) Provisional application No. 60/905,454, filed on Mar. 7, 2007.

(51) Int. Cl.
*B63C 9/08* (2006.01)
(52) U.S. Cl. ...................... 441/123; 119/856

(58) Field of Classification Search ................. 441/123; 119/856
See application file for complete search history.

(56) References Cited

U.S. PATENT DOCUMENTS

| 4,038,713 | A * | 8/1977 | O'Link ..................... 441/112 |
| 5,632,235 | A * | 5/1997 | Larsen et al. .............. 119/856 |
| 6,659,824 | B1 * | 12/2003 | McCormick ................ 441/88 |

* cited by examiner

*Primary Examiner*—Stephen Avila
(74) *Attorney, Agent, or Firm*—Ober / Kaler; Royal W. Craig

(57) ABSTRACT

The present invention is a dog "swim safe" floatation system, including flanking water wings sewn directly to a suspension-type harness for the dog. The harness can be adjusted by a system of Velcro and latches and thus the entire apparatus can be conveniently modified to promote stability. A canine floatation collar is also disclosed.

1 Claim, 4 Drawing Sheets

CANINE SWIM SAFE VEST AND COLLAR

CROSS-REFERENCE TO RELATED APPLICATION(S)

The present application derives priority from U.S. provisional application Ser. No. 60/905,454 filed 7 Mar. 2007.

BACKGROUND OF THE INVENTION

1. Field of the Invention

The present invention relates to canine floatation devices, and more particularly, to a canine floatation device and harness system with frontal flotation combined with attached water wings that, when deployed, lie flat on the water's surface and promote greater stability and buoyancy. A canine floatation collar is also disclosed.

2. Description of the Background

There are a variety of canine floatation devices that generally support the animal when in a water environment. The existing devices generally comprises a wrap-around vest formed of closed-cell foam or the like, that buckles around the dog. This particular design and construction has a degree of inherent instability that typically limits the use to "normal and healthy" participants that can assist in maintaining themselves upright in the water.

For example, U.S. Pat. No. D507,084 issued to Sabeth-Azar on Jul. 5, 2005 discloses an ornamental design for a pet floatation device. Sabeth-Azar's pet floatation device has two separate floating sections, one atop the back and one beneath the chest. This invention suffers from the aforementioned drawback, namely that the floatation sections do not promote any lateral stability, and the dog will tend to rollover in the water.

U.S. Pat. No. 7,160,167 to Peters issued Jan. 9, 2007 shows an a animal safety apparatus including a strap-like carrier and one or more non-inflatable floatation members secured substantially adjacent the carrier by a cover material stitched to the carrier.

Despite the foregoing, swimming and other water activities remain especially difficult for small dogs, or dogs that are handicapped, obese, or otherwise suffer from limited mobility. Small dogs have much shorter legs (and no inherent ballast or stability), and are far more susceptible to choppiness and wave motion. Likewise, handicapped dogs cannot counter wave motion and cannot use their legs to keep themselves upright. In both cases the dogs are very prone to rollover and drowning.

It would be greatly advantageous to provide a canine floatation device adapted especially for small dogs and dogs that suffer from limited mobility, which incorporates: 1) lateral water wings to promote floatation stability and prevent rollover: (2) a harness system that maintains the water wings in place for single plane buoyancy; (3) provides comfort and independence by allowing the wearer to swim freely or walk; (4) possesses a simple and scalable design for adaptation to any size dog; (6) is fabricated of lightweight and reflective materials providing an appropriate degree of buoyancy, comfort, flexibility, resiliency, durability, and longevity; and (6) is inexpensive to manufacture and sell for widespread use.

SUMMARY OF THE INVENTION

It is, therefore, the primary object of the present invention to provide canines with a floatation harness system especially for small dogs and dogs that suffer from limited mobility, which incorporates lateral water wings to promote flotation stability and prevent rollover, and which positions the water wings laterally alongside the upper torso for single plane buoyancy, in combination with an element of frontal flotation.

It is another object to provide a canine floatation device as described above that allows for an unrestricted, comfortable, and fully supported water activities, as well as freedom to walk or run on land.

Yet another object of the present invention is to provide for the attachment of the device with relative ease for both applicator and end user.

Still another object of the present invention is to provide for easy adjustment of the fit depending on the girth and length of the area to be harnessed.

Still another object of the present invention is to provide a floatation device that possesses a simple and scalable design.

It is another object of the present invention to provide a floatation device that is fabricated of lightweight reflective materials wherein provide an appropriate degree of buoyancy, flexibility, comfort, resiliency, durability, longevity, and support.

An additional object of the present invention is to provide a canine floatation device that is inexpensive to manufacture and sell to provide for widespread use and enjoyment.

These and other objects are accomplished with a canine floatation device with an integral buoyant stabilizing system including a harness with frontal flotation plus lateral water wings, wherein the harness once fully attached maintains the water wings laterally flanking the torso and running alongside the torso at shoulder blade level to provide a stable suspension-type flotation. Adjustable Velcro and latches are sewn within the harness system for security, adjustability and comfort, and the floatation component is comprised of highly buoyant and durable Styrofoam members inserted in nylon panels and sleeves. The entire device is easy to attach and remove, and is durable and lightweight. It provides exceptional stability especially for small dogs and dogs that suffer from limited mobility, and prevents rollover.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
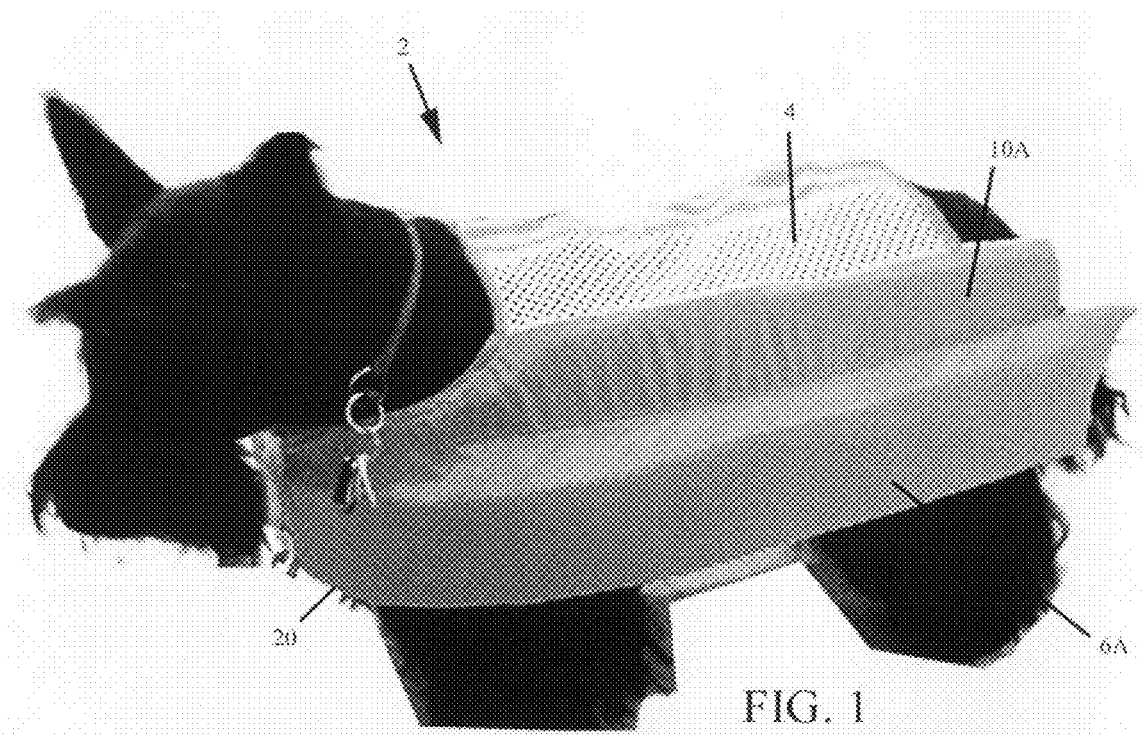
FIG. 1 is a side perspective view of the canine floatation device according to one embodiment of the present invention.
Figure 2:
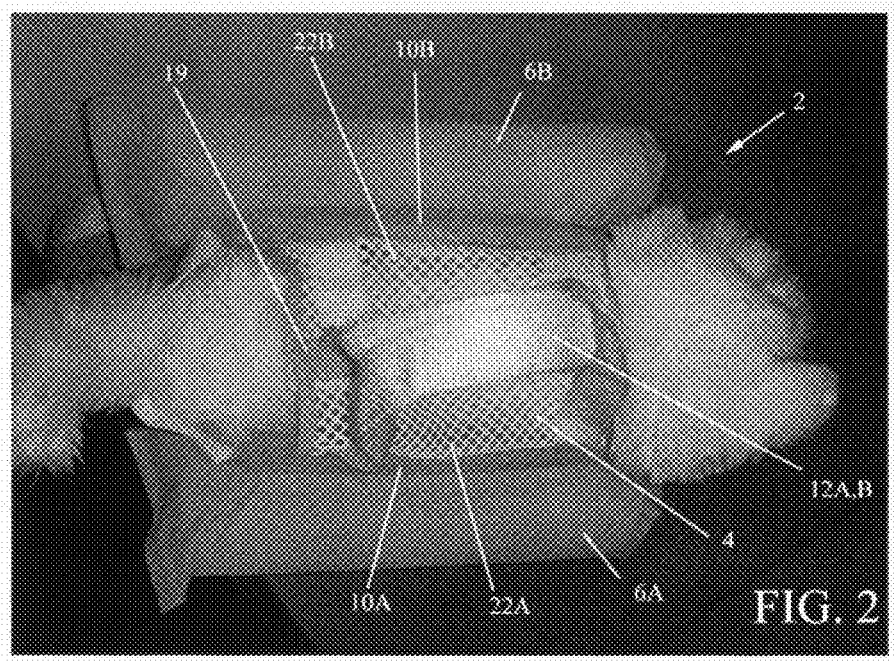
FIG. 2 is a front perspective view of the canine floatation device as in FIG. 1.

FIGS. 1 and 2 show side and front perspective views, respectively of a first embodiment of the present invention, which is a canine floatation device 2 especially for small dogs and dogs that suffer from limited mobility, that increases lateral stability in the water and prevents rollover. The canine floatation device 2 generally comprises a harness system 4 with attached water wings 6A, 6B flanking each side. Each water-wing 6A, 6B comprises a Nylon™ sleeve extending lengthwise, either closed at the front or wrapping around the front, and open at the rear but with a Velcro™ closure. A closed cell foam (e.g., Styrofoam™) strip or cylinder is inserted into each sleeve through the rear opening and is contained therein by the Velcro closure, which allows removal of the Styrofoam for cleaning or replacement. The sleeves are sewn lengthwise along the harness 4. Harness 4 generally comprises an underwrap for seating the dog and wrapping around overtop, where it is fastened onto itself. The harness 4 specifically includes two closed side panels formed of Nylon fabric sewn around the margins and enclosing flat elongate panels of closed cell foam, thereby forming buoyant sidewalls 10A, 10B. Each water-wing 6A, 6B is sewn directly onto the outside of a corresponding sidewall 10A, 10B. The sidewalls 10A, 10B run a majority of the length of the water wings 6A, 6B and are sewn along their entire periphery to the water wings 6A, 6B for added strength. Whereas the foam inside water wings 6A, 6B tapers and terminates toward the front of the dog, the buoyant sidewalls 10A, 10B wrap around front and attach to themselves (or are attachable by Velcro™ or other suitable fastener) to form a buoyant frontal collar 20 that adds to the in-water stability of the device 2.

Figure 3:
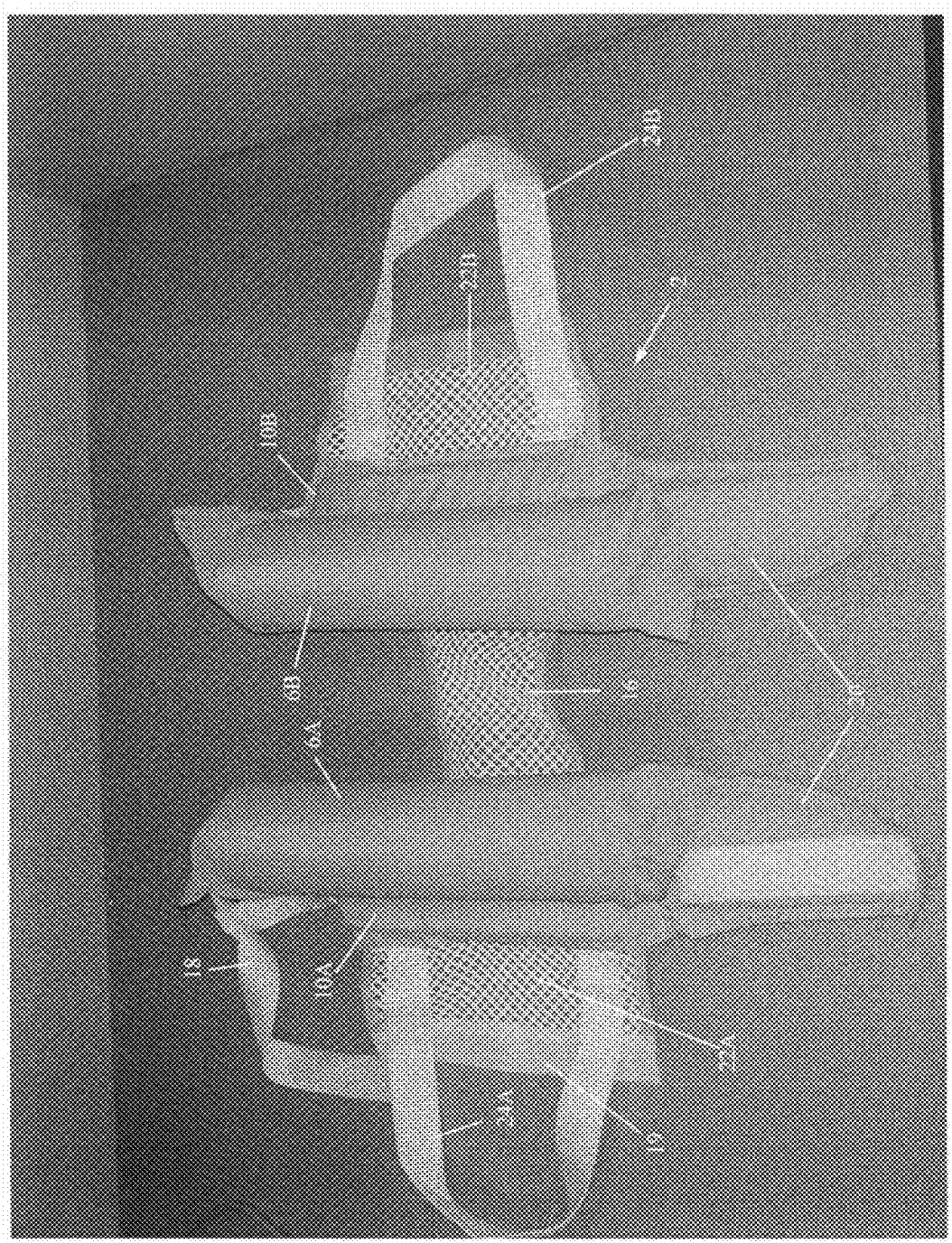
FIG. 3 is an assembly view of the canine flotation device as in FIGS. 1-2.

FIG. 3 is an assembly view of the canine floatation device substantially as shown in FIGS. 1-2. A rectangular section of nylon mesh webbing 16 with Nylon fabric-reinforced margins is sewn end-to-end, from one water-wing 6A to the other 6B. The webbing 16 provides under-torso support for the dog, yet is dimensioned to provide ample clearance up front and behind for the legs of the dog. For added strength the webbing 16 may be sewn between the sidewalls 10A, 10B where they are attached to water-wings 6A, 6B. The webbing 16 serves as both the torso supporting component for the dog as well as an anchoring system for the harness 4. At the rear of the harness 4, and sewn to the corresponding ends of the sidewalls 10A, 10B, lies an adjustable nylon strap 18 (two sections with buckle/clasp fastener). Strap 18 spans the sidewalls 10A, 10B and fastens around the butt of the dog. Similarly, at the front of the harness 4, and sewn to the corresponding ends of the sidewalls 10A, 10B, lies an attachable collar 20 (here, two sections with Velcro fastener). Collar 20 spans the sidewalls 10A, 10B and fastens by the Velcro around the chest of the dog. On the top of each sidewall 10A, 10B, a rectangular section of nylon mesh webbing 22a, 22b with Nylon fabric-reinforced margins is sewn along one side to each sidewall 10A, 10B and protrudes freely there from. For added strength the webbing 22a, 22b may be sewn between the margins of sidewalls 10A, 10B. The two rectangular sections of nylon mesh webbing 22a, 22b include opposing strips of Velcro fastener (19) at their distal ends to attach onto each other. Thus, the webbing 22a, 22b when so attached provides over-torso support for the dog, as well as an anchor for the harness 4. It should now be apparent that the above-described harness 4 affords over-, under-, and front and back restraint, yet still affords complete leg and full motion freedom for the dog. It also allows easy attachment to the dog. Optionally, at the top of the each of the sidewalls 10A, 10B and attached to the opposing webs 22a, 22b are looped handles 24A, 24B formed of Nylon straps sewn endwise in a loop. On the underside of the top left side handle 24A and the topside of the right side handle 24B are Velcro strips to allow the handles to be fastened together.

In use, the canine floatation device 2 of FIGS. 1-3 is attached by unfolding it as shown in FIG. 3, and placing it underneath the dog with mesh webbing 16 against the chest. The two rectangular sections of nylon mesh webbing 22a, 22b are then closed together overtop the dog and are secured with the opposing strips of Velcro fastener at their distal ends. The adjustable nylon strap 18 is then adjusted and secured behind the dog under the tail, and the front of the harness 4 is secured by the collar 20. When the dog is immersed in water, both the collar 20 as well as the flanking water wings 6A, 6B are supported by the harness 4 at approximately shoulder level and provide integral frontal and sidelong buoyancy for the dog. Moreover, since the wings 6A, 6B float on opposing sides of the dog the harness 4 provides a suspension-type support and anti-roll flotation for the dog.

Out of the water the dog is free to walk or run and can be carried by the optional handles 24A, 24B.

Figure 4:
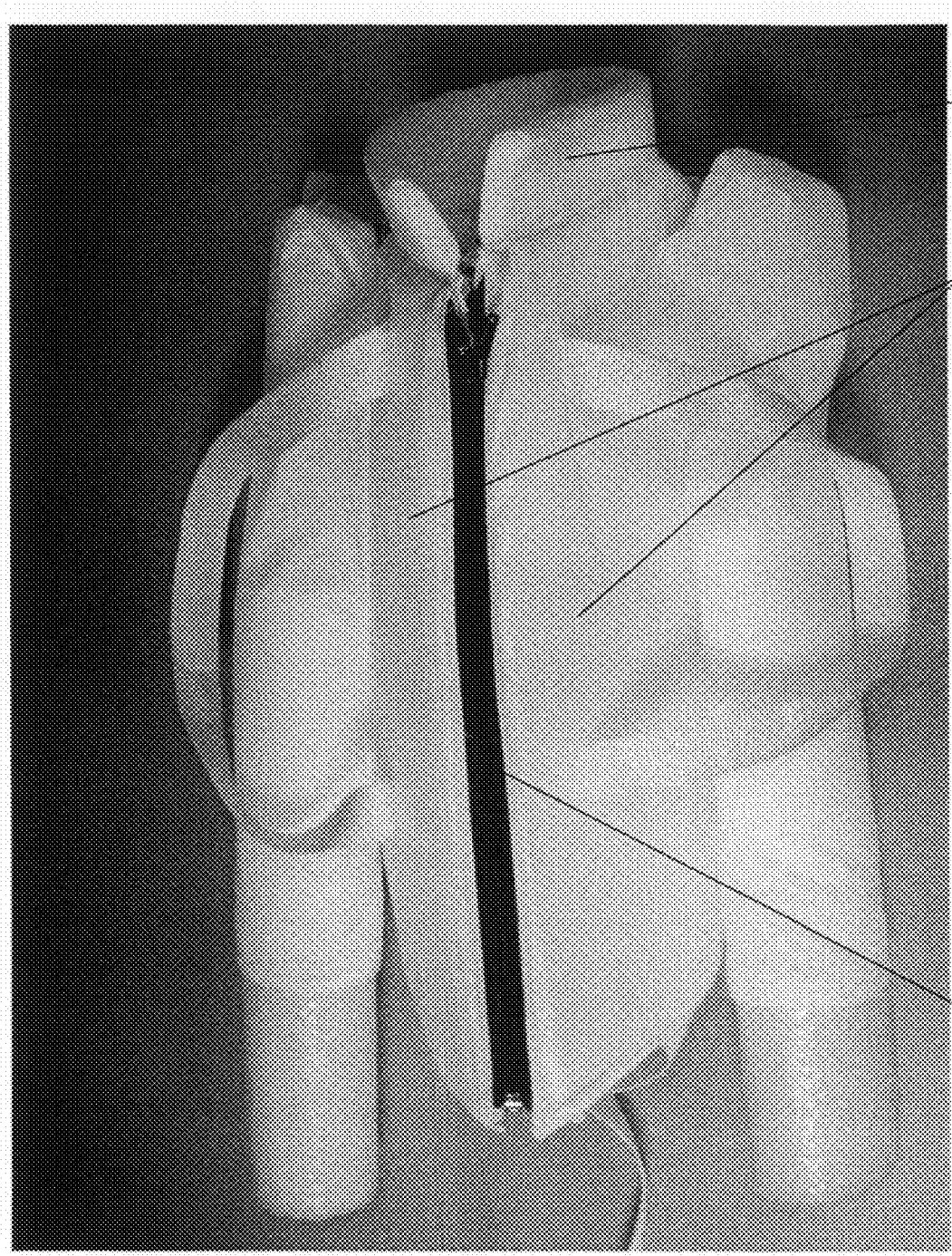
FIG. 4 is a top perspective photo of a slightly modified version of the flotation device as described above which illustrates some of the possible variations.

FIG. 4 is a top perspective photo of a slightly modified version of the floatation device as described above which illustrates some of the possible variations. In FIG. 4 the sidewalls 10A, 10B are much larger and extend above the back of the dog for additional flotation. In addition, rather than the attachable front-fitting collar 20 described above in regard to FIG. 3, a simple wrap-around collar 30 is provided. This provides the additional advantage of allowing a leash eye-clip to be attached to the collar 30. Furthermore, rather than a Velcro overhead closure a zipper 33 is provided. The foregoing amenities make the device more suitable for slightly larger dogs.

Figure 5:
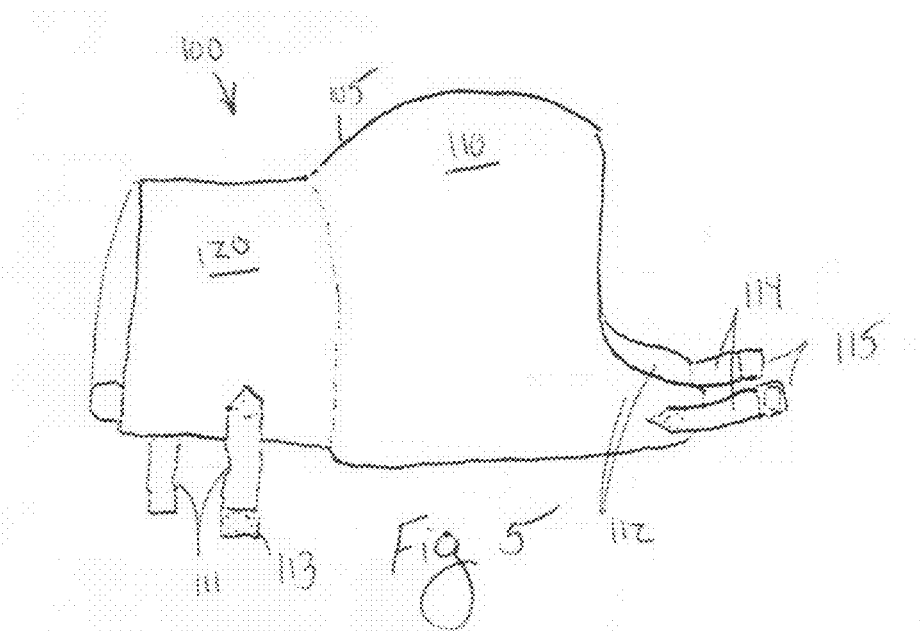
FIG. 5 is a side perspective view of an alternative embodiment of a canine floatation collar according to the present invention.

FIG. 5 is a side perspective view of an alternative embodiment of a canine floatation collar according to the present invention. Collar 100 generally comprises a blown closed-cell (EPI) foam harness 105 conforming to the upper torso of the dog and designed to wrap around the upper back, with side sections secured together around the upper chest of the dog (behind the fore-legs). The harness is also formed with forwardly protruding lobes 112 for securement together around the sternum of the dog (in front of the fore-legs). A rear portion of the harness 105 is formed of uniform-thickness foam (such as, for example, 0.5 inch) molded to maintain a semi-cylindrical shape to conform to the torso. The rear portion is integrally attached to a forward portion that is a thicker (for example, 1") foam and which includes a pronounced protuberance 110 at the upper neck of the dog forming an area of increased buoyancy relative to the rest of the harness 105. A pair of mating closure straps 114 are secured to the forwardly protruding lobes 112 and these may include a mating buckle 115, or Velcro™ or other closure device for securing the lobes 112 together around the sternum of the dog (in front of the fore-legs). Likewise, a pair of mating closure straps 111 are secured to the sides of the rear portion of the harness 105 and these may include a mating buckle 113, or Velcro™ or other closure device for securing the rear sides together around the torso of the dog (in back of the fore-legs). The rear portion of the harness 105 is dimensioned to leave an area of the chest open.

Figure 6:
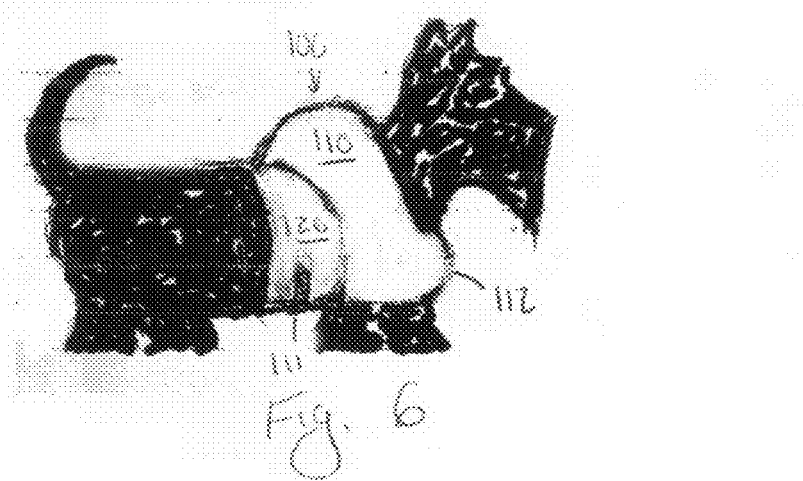
FIG. 6 is a side perspective view of the canine floatation collar as in FIG. 5 in use.

FIG. 6 is a side perspective view of the canine floatation collar as in FIG. 5 in use, illustrating the relative proportions of the protuberance 110 which, when secured, generally forms a pronounced collar running about the upper back and sternum of the dog for maximum buoyancy in this area, and especially at the upper back.

Figure 7:
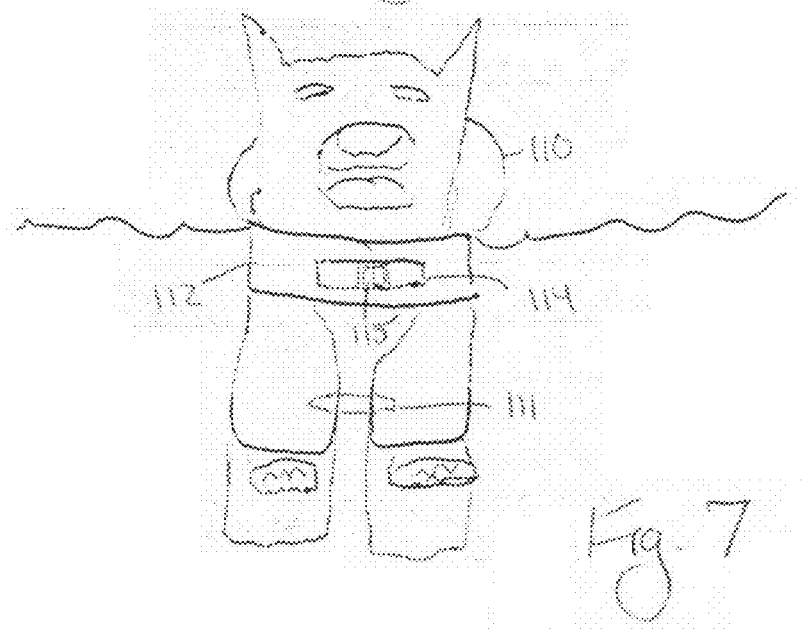
FIG. 7 is a front perspective view of the canine flotation collar as in FIGS. 5-6 in use.

FIG. 7 is a front perspective view of the canine flotation collar as in FIGS. 5-6 in use, and showing the protuberance 110 maintains maximum buoyancy in back of the dogs head, keeping the dog upright and head-down in water despite shorter (no ballast) legs and waves.

Regardless of the possible variation, the above-described device possesses a simple and scalable design and provides the appropriate degree of buoyancy, support, resiliency, durability, and longevity. It prevents roll and prevents drowning. The components are simple to assemble, inexpensive to manufacture and sell, thereby providing for widespread use and benefit. When the dog is immersed in water, the collar 100 supports it at approximately shoulder level and provides integral buoyancy for the dog at the nape of the neck, maintaining position. This in combination with the dual-securement of the harness 105 provides a suspension-type support and anti-roll flotation for the dog.

Having now fully set forth the preferred embodiment and certain modifications of the concept underlying the present invention, various other embodiments herein shown and described will obviously occur to those skilled in the art upon becoming familiar with said underlying concept. It is to be understood, therefore, that the invention may be practiced otherwise than as specifically set forth in the appended claims.

I claim:

1. Canine Floatation Device, comprising:

a harness for suspending a dog from underneath, and attachable in front of said dog, behind, and overtop said harness further comprising two opposing elongate sleeves attached together along their width by a rectangular section of mesh webbing for under-torso support of said dog, two rectangular sections of mesh webbing each attached above a corresponding sleeve and attachable together above said dog to provide over-torso support, a frontal collar attachable end-to-end between said two opposing elongate sleeves in front of said dog, and an adjustable strap attachable end-to-end between said two opposing elongate sleeves to fasten around behind said dog; and a closed cell foam insert in said frontal collar to provide buoyancy at the chest of said dog;

a pair of opposing elongate closed cell foam inserts each inserted into a corresponding sleeve and maintained by said harness to extend laterally on opposing sides of said dog at substantially shoulder height for promoting sidelong buoyancy.

* * * * *